(12) United States Patent
Linhart et al.

(10) Patent No.: US 6,738,015 B1
(45) Date of Patent: May 18, 2004

(54) VECTOR EXTENDED RANGE CORRELATION TRACKING OF GLOBAL POSITIONING SYSTEM (GPS) SIGNALS

(75) Inventors: Paul D. Linhart, Tabernacle, NJ (US); Gary A. Mc Graw, Cedar Rapids, IA (US); Bernard A. Schnaufer, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/308,949

(22) Filed: Dec. 3, 2002

(51) Int. Cl.[7] .............................................. H04B 7/185
(52) U.S. Cl. .............................. 342/357.15; 342/357.12
(58) Field of Search ....................... 342/357.15, 357.12, 342/357.06

(56) References Cited

U.S. PATENT DOCUMENTS 6,331,835 B1 * 12/2001 Gustafson et al. ....... 342/357.06

OTHER PUBLICATIONS

D. Gustafson et al., A deeply integrated adaptive GPS–based navigator with extended range code tracking, IEEE Position Location and Navigation Symposium, p. 118–124, Mar. 2000.*

D. Gustafson et al., A high anti–jam GPS–based navigator, Institute of Navigation National Technical Meeting, p. 495–503, Jan. 2000.*

* cited by examiner

*Primary Examiner*—Thomas H. Tarcza
*Assistant Examiner*—F H Mull
(74) *Attorney, Agent, or Firm*—Nathan O. Jensen; Kyle Eppele

(57) ABSTRACT

A vector extended range correlation (ERC) apparatus and method tracks signals transmitted from satellites in a GPS network in extremely low signal to interference plus noise ratio (SINR) environments. A GPS receiver antenna receives the signals transmitted from the satellite, and the signals are converted into digital input signals for each satellite on individual channels. A pseudorange error measurement is generated for each individual channel, and the pseudorange error measurements for all of the individual channels are operated on to generate line-of-sight (LOS) signal tracking commands for each individual channel that are based on the pseudorange error measurements for all of the individual channels. Timing and frequency states for each individual channel are updated based on the LOS signal tracking commands for the respective individual channel.

19 Claims, 3 Drawing Sheets

VECTOR EXTENDED RANGE CORRELATION TRACKING OF GLOBAL POSITIONING SYSTEM (GPS) SIGNALS

BACKGROUND OF THE INVENTION

The present invention relates to a global positioning system (GPS) receiver apparatus with improved performance and tracking ability in jamming and low signal strength environments.

In military and commercial GPS applications, the GPS signal is susceptible to intentional and/or unintentional reductions in the signal-to-interference-plus-noise ratio (SINR), which could cause the GPS receiver to lose track of the satellite. Reduction in the SINR could be a result of jamming (an increase in the level of interference) or of attenuated signal strength. For military applications, reduction in the SINR typically comes from an intentional jamming source. For commercial applications, unintentional radio frequency (RF) interference or building obstructions can reduce the SINR for a particular satellite.

A GPS receiver initially acquires satellite signals by searching the sky for available satellites. The receiver often has information about the availability and relative location of satellites, based on stored almanac information and/or user input of an approximate current position and time. Since each satellite transmits its own unique pseudo-random noise (PRN) code, the receiver searches for a particular satellite by locally generating the corresponding PRN code sequence, processing the RF signal received by the receiver antenna, and "mixing" the PRN code sequence with the RF signal. Once the receiver is able to track the signals from a set of at least four satellites, it transitions to navigation mode.

The satellites transmit their unique PRN code sequence at a particular carrier frequency. As a result, tracking of the satellites requires maintaining an estimate of the signal carrier frequency and/or phase, as well as the PRN code timing. However, the ability to track the carrier frequency is typically lost when the SINR gets too low, although code tracking may still be possible. As the SINR is reduced further, code tracking fails as well.

Many methods have been employed in GPS systems to counteract the effects of jamming, including antenna nulling/beam steering and various algorithmic methods such as extended range correlation (ERC) techniques. ERC techniques enable tracking of the code phase of satellite signals in reduced SINR environments. These techniques have been employed in military GPS receivers to improve their performance in low SINR situations. As SINR drops even further, though, even ERC techniques cannot always maintain code tracking.

Code and carrier tracking of satellite signals in a GPS system is done to provide what are known as pseudorange and deltarange measurements. These measurements are manipulated by a navigation processor to form a position, velocity and time solution. The deltarange measurements are direct observations of velocity, with some error associated therewith. The pseudorange measurements provide observations of position, again with some error associated therewith. A GPS receiver is capable of navigating with only pseudorange measurements, although the velocity solution provided on the basis of pseudorange measurements only suffers from increased noise. The carrier frequency/phase tracking loop of the GPS receiver provides the deltarange measurements and the code phase tracking loop provides the pseudorange measurements.

A typical ERC-enabled GPS system employs a component such as a Kalman filter to use pseudorange measurements to form an estimate of, among other things, position and velocity. The velocity information is used to aid all channels in tracking the carrier frequency. Specifically, the GPS receiver must generate a carrier frequency estimate even when carrier tracking is not possible due to a reduced SINR. Since the satellite being tracked is moving in space with respect to the earth, and since the GPS receiver may be moving relative to the earth, a Doppler effect will cause the apparent carrier frequency manifested by the satellite at the GPS receiver to change. The carrier tracking loop performed by the GPS receiver tracks these changes in carrier frequency, and provides a numerically controlled oscillator (NCO) with appropriate commands to adjust the locally generated estimate of the carrier frequency. The Kalman filter provides each channel with an estimate of the Doppler effects, which is used to help adjust the NCO commands to estimate the carrier frequency when accurate carrier tracking is not possible.

Although ERC techniques as generally described above have improved the low SINR performance of GPS systems, further improvements are desirable for extremely low SINR situations, such as may occur due to jamming in a military application or due to environmental considerations for GPS systems used in a large city, for example. The present invention enables further improvements in GPS system performance by implementing a vector-type ERC system, with cooperation between multiple channels.

BRIEF SUMMARY OF THE INVENTION

The present invention is an apparatus and method for tracking signals transmitted from satellites in a GPS network. A GPS receiver antenna receives the signals transmitted from the satellite, and the signals are converted into digital input signals for each satellite on individual channels. A pseudorange error measurement is generated for each individual channel, and the pseudorange error measurements for all of the individual channels are operated on to generate line-of-sight (LOS) signal tracking commands for each individual channel that are based on the pseudorange error measurements for all of the individual channels. Timing and frequency states for each individual channel are updated based on the LOS signal tracking commands for the respective individual channel.

DETAILED DESCRIPTION

Figure 1:
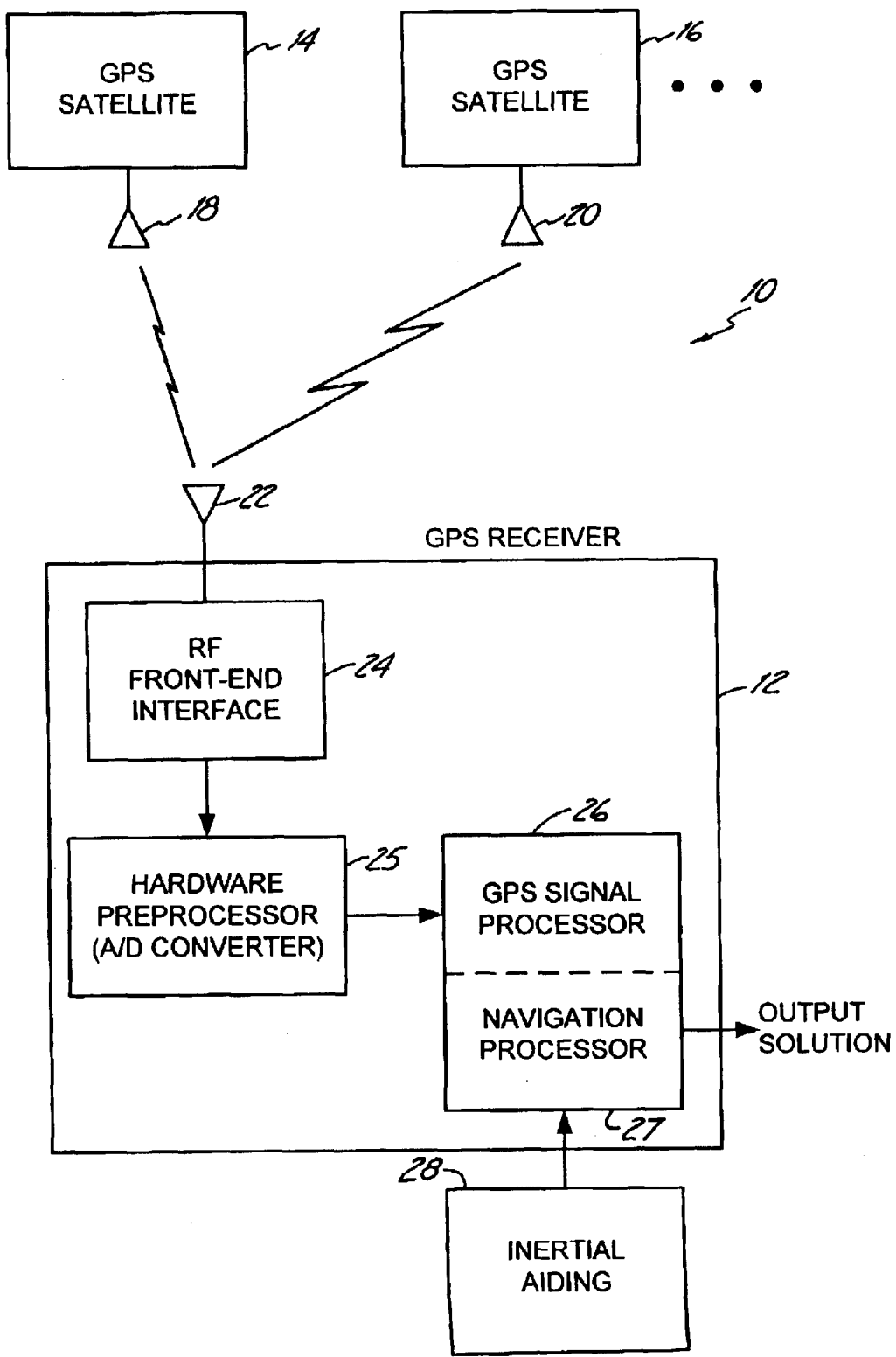
FIG. 1 is a block diagram of a GPS system including a GPS receiver for implementing the vector ERC system of the present invention.

FIG. 1 is a block diagram illustrating GPS system 10 including GPS receiver 12 for implementing the vector ERC system of the present invention. GPS system 10 also includes a plurality of GPS satellites such as GPS satellites 14 and 16 having radio frequency (RF) antennas 18 and 20, respectively, for transmitting RF signals. GPS receiver 12 includes RF antenna 22 for receiving the RF signals transmitted from antennas 18 and 20 of GPS satellites 14 and 16. GPS receiver 12 further includes RF front-end interface 24, hardware pre-processor 25 (which includes an analog-to-digital (A/D) converter), GPS signal processor 26 and navigation processor 27 comprising the digital tracking and navigation system of the receiver. GPS receiver 12 also includes an interface to external inertial aiding system 28. RF front-end interface 24 is operatively coupled to RF antenna 22 to convert the RF signal received by antenna 22 into electronic signals for processing by the functional components of GPS receiver 12. Hardware pre-processor (A/D converter) 25 is coupled to RF front-end interface 24 to convert the analog electronic signals provided by RF front-end interface 24 into digital signals for tracking and navigation processing. GPS signal processor 26 is coupled to hardware pre-processor (A/D converter) 25 to perform tracking processing on the electronic signals. Navigation processor 27 is coupled with GPS signal processor 26 to perform high-level navigation functions and routines in order to determine an Earth-Centered-Earth-Fixed position of the antenna of GPS receiver 12 (the typical function of a GPS system) based on the signals received from GPS satellites 14 and 16 and subsequently processed by RF front-end interface 24, hardware pre-processor (A/D converter) 25 and GPS signal processor 26. External inertial aiding system 28 is coupled to navigation processor 27 to provide further velocity measurements that assist navigation processor 27 in determining the relative position of GPS receiver 12.

The functions performed by the components of GPS receiver 12 in order to determine a relative position of GPS receiver 12 are relatively complicated and are generally known in the art. For the sake of simplicity, these functions are not explained in detail herein. In order to clearly describe the present invention, it will suffice to point out that the ERC functions which enable GPS satellite tracking in low SINR environments are performed by the digital tracking and navigation system comprised of GPS signal processor 26 and navigation processor 27. Therefore, the vector-based ERC system of the present invention, which is described in detail below, resides in GPS signal processor 26 and navigation processor 27, with the exact implementation of components in those two functional blocks being a matter of design choice for one skilled in the art.

Figure 2:
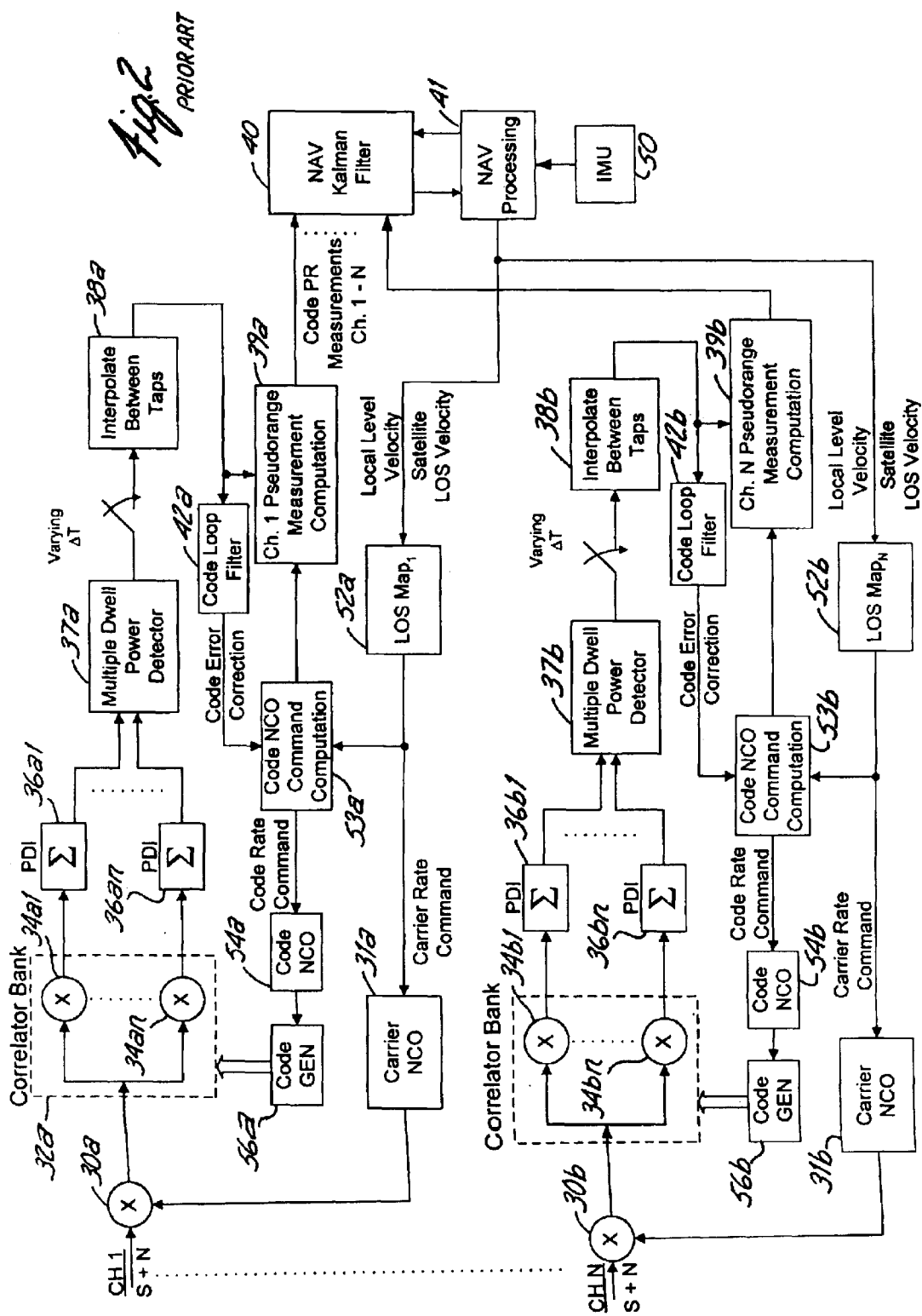
FIG. 2 is a functional block diagram illustrating a prior art ERC system.

FIG. 2 is a functional block diagram illustrating a prior art ERC system, which is shown in order to better illustrate the differences between conventional ERC systems and the vector ERC system of the present invention. The ERC system in FIG. 2 operates on data from a plurality of satellite channels, illustrated for simplicity as channel 1 and channel N. Since the components for operating on each channel are identical, the components are referred to in FIG. 2 by the same reference numbers with an 'a' or 'b' following the number. For the sake of simplicity, the detailed description of components below will focus on the components for channel 1 only.

The digitized signal input to each channel includes a signal component and a noise component, and is therefore represented as 'S+N.' The input signal has a time delay associated with it that is related to the distance traveled from the satellite to the receiver's antenna, and also has a frequency or phase offset associated with it due to satellite orbital and receiver antenna motion, among other effects. Mixer 30a operates to remove the frequency offset information from the input signal. Carrier numerically controlled oscillator (NCO) 31a generates a local signal that is also input to mixer 30a. Correlator bank 32a includes a plurality of complex mixers 34a1–34an, which produce output samples that are subsequently used to extract the time delay information from the input signal. The samples are generated in each mixer 34a1–34an by multiplying the input signal by a plurality of locally generated code signals that are nominally advanced, delayed, and "on time" (prompt) relative to the incoming signal. The mixer outputs are provided to pre-detection integrators 36a1–36an which output the samples. The sample information is all input to Multiple Dwell Power Detector (MDPD) 37a, which determines the correlator power characteristics necessary to compute a pseudorange error measurement signal. MDPD 37a computes power sums from the samples of all n complex correlators over a multiplicity of integration intervals concomitantly and performs a series of threshold checks on the computer power sums. Due to the structure of the algorithm performed by MDPD 37a, outputs are generated at potentially irregular intervals. This is signified in FIG. 2 by the notation "Varying ΔT." When MDPD 37a produces a set of correlator power outputs, the outputs are used by "Interpolate Between Taps" block 38a to generate a pseudorange error signal (with "Taps" referring to correlator output power samples). The exact operations performed by MDPD 37a and "Interpolate Between Taps" block 38a may vary depending on the received SINR.

The signal that results from the foregoing analysis is a channel 1 pseudorange error estimate, which is used to compute a pseudorange error measurement at block 39a. The pseudorange error measurement is then input to navigation Kalman filter 40 along with the pseudorange error measurements for all of the channels of the GPS system.

Navigation Kalman filter 40 receives as input the pseudorange error measurements from all of the channels of the GPS system. Kalman filter 40 also communicates with navigation processing circuitry 41, which in turn communicates with inertial measurement unit (IMU) processing circuitry 50 to adjust for the speed and orientation of the GPS receiver. Kalman filter 40 operates on the pseudorange error estimates received from each of the channels, and together with inputs from navigation processing circuitry 41 computes corrections to the a local level position and velocity solution. These position and velocity solution corrections are communicated to and applied in navigation processing circuitry 41. The corrected solution information is used to generate code and carrier rate commands via LOS maps 52a–52n for each channel. For example, a channel 1 carrier NCO rate command is provided to carrier NCO 31a based on the information derived from projecting the local level velocity solution onto the satellite LOS computed with LOS map 52a. The satellite LOS velocity is also accounted for in this operation. The code NCO rate command is provided to code NCO 44a by converting the carrier NCO command to code NCO units in code NCO command computation block 53a. Code NCO 54a generates a signal that operates code generator 56a, which provides the sample information to correlator bank 32a for operation as described above. The channel 1 pseudorange error estimate is also routed in a local code feedback loop through code loop filter 42a to code NCO command computation block 53a, to provide occasional corrections to the code NCO control to help compensate for navigation errors.

The ERC system shown in FIG. 2 provides improved ability to track GPS satellite signals in low SINR scenarios. However, as will be shown and described with respect to FIG. 3, an approach in which each channel considers information from all of the other channels for navigation and tracking, a so-called vector ERC system, can provide even further improvement in tracking low SINR signals.

Figure 3:
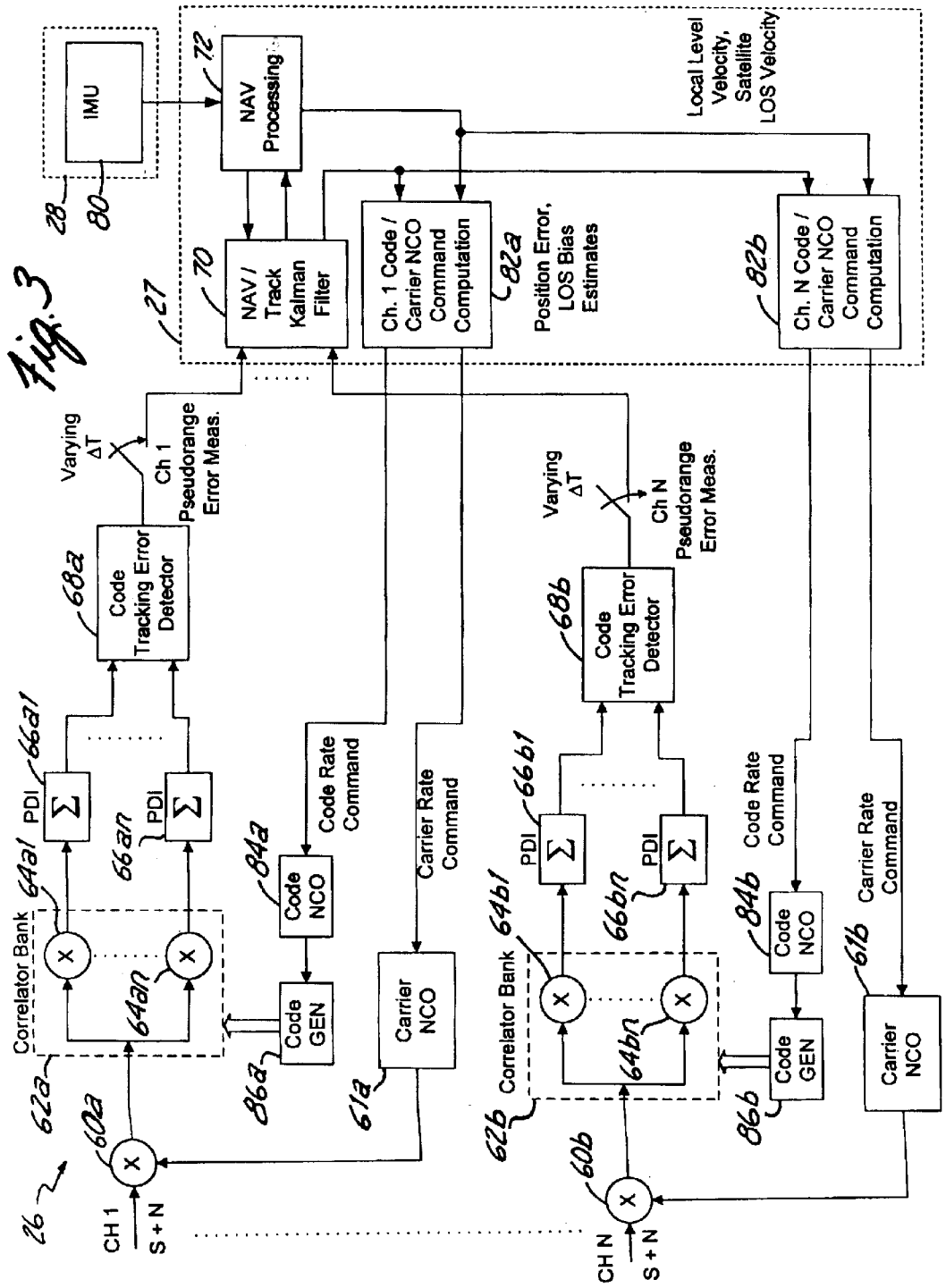
FIG. 3 is a functional block diagram illustrating the vector ERC system of the present invention.

FIG. 3 is a functional block diagram illustrating the vector ERC system of the present invention. Again, the ERC system in FIG. 3 operates on data from a plurality of satellite channels, illustrated for simplicity as channel 1 and channel N. Since the components for operating on each channel are identical, the components are referred to in FIG. 3 by the same reference numbers with an 'a' or 'b' following the number for channel 1 and channel N, respectively. For the sake of simplicity, the detailed description of components below will focus on the components for channel 1 only.

As in FIG. 2, the digitized signal input to each channel is operated on by mixer 60a, which extracts frequency offset information from the input signal. Carrier numerically controlled oscillator (NCO) 61 a generates a local signal that is also input to mixer 60a. Correlator bank 62a includes a plurality of complex mixers 64a1–64an, which produce output samples that are subsequently used to extract time delay information from the input signal. The mixer outputs are provided to pre-detection integrators 66a1–66an which output the samples. The sample information is all input to Code Tracking Error Detector 68a, which operates to determine the channel 1 pseudorange error measurement. Code Tracking Error Detector 68a computes a code phase error signal, for example using an "Early Minus Late" discriminant function which is commonly known to one who is skilled in the art. Code Tracking Error Detector 68a estimates the SINR based on the outputs of predetection integrators 66a1–66an and potentially on other inputs, and includes a multiplicative compensation factor for the aforementioned discriminant function error signal to compensate both for dynamical effects over the integration period as well as discriminant function performance at low SFNR. The compensation factor varies with the SINR according to a formula or look-up table to give optimal performance based on a statistical analysis (not performed in conjunction with the vector ERC system).

The measurement output rate of Code Tracking Error Detector 68a is set at a constant rate, whose interval is an integer multiple of the cycle period of Navigation and Tracking Kalman Filter 70, based on estimated SINR according to a formula or look-up table. The formula or look-up table, which is distinct from those mentioned in conjunction with the multiplicative compensation factor, is intended to allow optimal estimation of the code phase error over the operating range of SINR based on a statistical analysis of Code Tracking Error Detector output samples (not performed in conjunction with the vector ERC system). At very low SINR, lower update rates are typically assigned because the extended integration of the correlator samples provides a less noisy estimate of pseudorange error from Code Tracking Error Detector 68a. For a constant SINR the measurement rate will also be held constant. However, in a changing SINR environment the selection of measurement rates will vary, resulting in a variable measurement rate. Because of this possibility the measurement output rate in FIG. 3 is labeled "Varying ΔT." It should be noted that the measurement output rate of Code Tracking Error Detector 68a is independent among tracking channels. Code Tracking Error Detector 68a also provides an estimate of the SINR to Navigation and Tracking Kalman Filter 70 for proper measurement weighting.

The signal that results from the foregoing analysis is a channel 1 pseudorange error measurement, which is input to Navigation and Tracking Kalman filter 70 along with the pseudorange error measurements for all of the channels of the GPS system. Navigation and Tracking Kalman filter 70 also communicates with navigation processing circuitry 72, which in turn communicates with inertial measurement unit (IMU) processing circuitry 80 to adjust for the speed and orientation of the GPS receiver. Navigation and Tracking Kalman filter 70 operates on the pseudorange error measurements received from each of the channels, and together with inputs from navigation processing circuitry 72 provides local level velocity and position solution corrections to navigation processing circuitry 72, as well as line-of-sight (LOS) bias estimates for each channel. The LOS bias estimates account for the fact that each satellite of the GPS system has a clock offset from absolute GPS time and for the fact that propagation errors (such as might be caused by the ionosphere) will be different for each satellite. The corrected solution information from navigation processing circuitry 72 and LOS bias estimate information from Navigation and Tracking Kalman filter 70 are used to generate LOS signal tracking commands such as code and carrier NCO commands at blocks 82a, 82b for each channel, with each channel's code and carrier NCO commands being based on information from all of the GPS system channels. Although the computations of code and carrier NCO commands are shown in separate functional blocks 82a, 82b from Navigation and Tracking Kalman filter 70, it should be understood that the generation of the local level velocity and position solution and LOS bias estimates is performed in an integrated filtering operation with the computation of code and carrier NCO commands for each channel. A code rate command is provided to code NCO 84a based on the information input to computation block 82a. A carrier rate command is provided to carrier NCO 61a based on the information input to computation block 82a, to remove residual 'Doppler effects from the signals received by the GPS receiver. Code NCO 84a generates a signal that operates code generator 86a, which provides the locally generated code signal to correlator bank 62a for operation as described above. The code and carrier rate commands operate code NCO 84a, code generator 86a and carrier NCO 61a to update the timing and frequency state of the signal received on channel 1, incorporating information from the pseudorange error measurements of all of the other channels of the system as well.

The vector ERC system shown in FIG. 3 eliminates the code loop feedback path within each channel of the system, and replaces that code tracking function with information provided by Navigation and Tracking Kalman filter 70 that incorporates information from all of the actively tracking channels of the GPS system rather than just information from each particular channel. As a result, code tracking for each channel may be achieved for even lower SINR environments than could be accommodated with conventional ERC techniques, due to the additional information utilized from other satellites in the GPS system to assist individual tracking on each channel. This capability is enabled by modifying the Kalman filter to include LOS bias states for each channel.

The present invention therefore provides a GPS system that employs vector ERC techniques to improve the performance of the system in extremely low SINR situations, such as may occur due to jamming in a military application or due to environmental considerations for GPS systems used in a large city, for example. Code and carrier tracking of satellite signals are performed with greater efficacy by mapping information from all of the satellites of the GPS system into the line of sight (LOS) information for each satellite to drive the locally generated code sequence and carrier frequency. This cooperation among multiple satellite channels enables code and carrier tracking for lower SINR environments than could previously be accommodated with conventional ERC techniques.

Although the present invention has been described with reference to preferred embodiments, workers skilled in the art will recognize that changes may be made in form and detail without departing from the spirit and scope of the invention.

What is claimed is:

1. A method of tracking signals transmitted from satellites in a GPS network, the method comprising:
   (a) receiving the signals transmitted from the satellites at a GPS receiver antenna;
   (b) converting the signals into digital signals for each satellite on individual channels;
   (c) generating a pseudorange error measurement for each individual channel;
   (d) operating on the pseudorange error estimates for all of the individual channels to generate line-of-sight (LOS) signal tracking commands for each individual channel that are based on the pseudorange error measurements for all of the individual channels; and
   (e) updating a timing and frequency state for each individual channel based on the LOS signal tracking command for the respective individual channel.

2. The method of claim 1, wherein operating on the pseudorange error measurements for all of the individual channels to generate LOS signal tracking commands for each individual channel comprises:
   computing code and carrier rate commands via LOS signal tracking computations for each individual channel.

3. The method of claim 2, wherein updating the timing and frequency state for each individual channel comprises:
   updating a carrier numerically controlled oscillator (NCO) for each individual channel with the computed carrier rate commands to remove residual doppler effects from the received GPS signals; and
   updating a code NCO for each individual channel with the computed code rate commands to provide locally generated signals for use in computing correlation samples to determine subsequent pseudorange error measurements.

4. The method of claim 2, wherein operating on the pseudorange error measurements for all of the individual channels to generate LOS signal tracking commands for each individual channel comprises:
   generating a local level position and velocity solution in an integrated filtering operation with the computation of the code and carrier rate commands for each individual channel.

5. The method of claim 2, wherein operating on the pseudorange error measurements for all of the individual channels to generate LOS maps for each individual channel comprises:
   generating LOS bias estimates in an integrated filtering operation with the computation of the code and carrier rate commands for each individual channel.

6. The method of claim 1, wherein operating on the pseudorange error estimates for all of the individual channels to generate LOS signal tracking commands for each individual channel comprises:
   adjusting for the speed and orientation of the GPS receiver.

7. The method of claim 1, wherein generating the pseudorange error measurement for each individual channel comprises:
   removing frequency offset information from the digital signals for each satellite;
   producing correlation sample information to extract time delay information from the digital signals for each satellite; and
   determining the pseudorange error measurement for each individual channel based on the correlation sample information.

8. The method of claim 7, wherein the correlation sample information comprises a plurality of correlator samples having a precisely specified timing relationship.

9. The method of claim 7, wherein determining the pseudorange error measurement for each individual channel comprises:
   computing a code phase error signal based on the correlation sample information;
   estimating a signal to noise plus interference (SINR); and
   compensating the code phase error signal based on the estimated SINR.

10. The method of claim 9, wherein determining the pseudorange error measurement for each individual channel further comprises:
    adjusting an output rate of computing the code phase error signal based on the estimated SINR.

11. The method of claim 10, wherein the output rate of computing the code phase error signal based on the estimated SINR is adjusted so that an output interval of the code phase error signal corresponds to an integration interval of the correlation sample information used to compute the code phase error signal.

12. A GPS receiver apparatus for tracking signals transmitted from satellites in a GPS network, the apparatus comprising:
    an antenna;
    a hardware processor for converting the signals transmitted from the satellites into digital input signals for each satellite on individual channels;
    signal processing circuitry for generating a pseudorange error measurement for each individual channel based on the digital input signals; and
    navigation processing circuitry operatively connected to the signal processing circuitry for generating line-of-sight (LOS) signal tracking commands for each individual channel that are based on the pseudorange error measurements for all of the individual channels, and for updating a timing and frequency state for each individual channel based on the LOS signal tracking commands for the respective individual channel.

13. The apparatus of claim 12, wherein the navigation processing circuitry includes a Kalman filter operating on the pseudorange error measurements for all of the individual channels to generate a local level velocity and position solution and LOS bias estimates for each channel.

14. The apparatus of claim 12, further comprising inertial measurement unit (IMU) circuitry operatively connected to the navigation processing circuitry to adjust the generating of the LOS signal tracking commands for a speed and orientation of the GPS receiver.

15. The apparatus of claim 12, wherein the signal processing circuitry for each channel comprises:
    means for removing frequency offset information from the digital input signals for each satellite;
    means for producing correlation sample information to extract time delay information from the digital input signals for each satellite; and
    means for determining the pseudorange error measurement for each individual channel based on the correlation sample information.

16. The apparatus of claim 12, wherein the signal processing circuitry for each channel comprises:
  a mixer that receives the digital input signal and outputs a first modified signal having frequency offset information removed from the digital input signal;
  a correlator bank that receives the first modified signal and produces a plurality of output samples;
  a plurality of pre-detection integrators that receive the plurality of output samples and output integrated output samples;
  a code tracking error detector that receives the integrated output samples and generates the pseudorange error measurement.

17. The apparatus of claim 16, wherein the code tracking error detector compensates the pseudorange error measurement based on an estimated signal to interference plus noise ratio (STNR) of the digital input signal.

18. The apparatus of claim 16, wherein a measurement output rate of the code tracking error detector is based on a signal to interference plus noise ratio (SINR) of the digital input signal.

19. The apparatus of claim 18, wherein the code tracking error detector provides an estimate of the SINR of the digital input signal to the navigation processing circuitry.

* * * * *